United States Patent
Shin et al.

(10) Patent No.: US 9,925,925 B2
(45) Date of Patent: Mar. 27, 2018

(54) VARIABLE PARTITION APPARATUS FOR TRUNK OF VEHICLE

(71) Applicants: Hyundai Motor Company, Seoul (KR); Kia Motors Corporation, Seoul (KR)

(72) Inventors: Han Shin, Whasung-Si (KR); Sang Eun Jang, Whasung-Si (KR); Sung Mo Lee, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 390 days.

(21) Appl. No.: 14/570,125

(22) Filed: Dec. 15, 2014

(65) Prior Publication Data

US 2016/0059791 A1    Mar. 3, 2016

(30) Foreign Application Priority Data

Sep. 2, 2014  (KR) .................... 10-2014-0115905

(51) Int. Cl.
*B60R 9/00* (2006.01)
*B60R 11/00* (2006.01)
*B60R 7/02* (2006.01)
*B60R 9/06* (2006.01)
*B60R 5/04* (2006.01)

(52) U.S. Cl.
CPC .............. *B60R 7/02* (2013.01); *B60R 5/04* (2013.01); *B60R 9/06* (2013.01); *B60R 11/00* (2013.01); *B60R 2011/008* (2013.01); *B60R 2011/0036* (2013.01)

(58) Field of Classification Search
CPC .. B60R 7/02; B60R 5/504; B60R 9/06; B60R 11/00; B60R 2011/0036; B60R 2011/008; B60R 13/011; B62D 33/042; B60P 7/14; B60P 7/0815
USPC ................... 224/539, 281, 542, 543
See application file for complete search history.

(56) References Cited

U.S. PATENT DOCUMENTS

| 3,004,678 | A | * | 10/1961 | Golaski | ................... | B60R 5/041 |
| | | | | | | 224/487 |
| 4,358,035 | A | * | 11/1982 | Heidecker | ................ | B60R 7/02 |
| | | | | | | 220/533 |
| 4,540,213 | A | * | 9/1985 | Herlitz | ..................... | B60R 7/02 |
| | | | | | | 211/195 |

(Continued)

FOREIGN PATENT DOCUMENTS

| EP | 1736364 A1 | * | 12/2006 | ............. | B60R 13/01 |
| EP | 1736365 A1 | * | 12/2006 | ............. | B60R 13/01 |

(Continued)

*Primary Examiner* — Adam Waggenspack
*Assistant Examiner* — Lester L Vanterpool
(74) *Attorney, Agent, or Firm* — Morgan Lewis & Bockius LLP (57) ABSTRACT

A variable partition apparatus for a trunk of a vehicle may include a luggage board having a guide rail and arranged on an bottom surface of a trunk room, an actuating unit configured to move forwards, rearwards, leftwards, and rightwards along the guide rail, a board fixing unit coupled to an upper portion of the actuating unit and in which a partition board may be fixedly assembled while being erected, and a partition board configured to move and rotate on the luggage board by the actuating unit to variably divide the trunk room.

11 Claims, 7 Drawing Sheets

(56) References Cited

U.S. PATENT DOCUMENTS

| | | | | |
|---|---|---|---|---|
| 5,035,184 | A * | 7/1991 | Bott | B60P 7/135 104/121 |
| 5,584,412 | A * | 12/1996 | Wang | B65D 25/04 220/500 |
| 5,715,978 | A * | 2/1998 | Ackeret | B60P 7/0815 224/310 |
| 5,762,244 | A * | 6/1998 | Wagner | B60R 11/00 224/281 |
| 5,931,632 | A * | 8/1999 | Dongilli | B60R 9/00 224/404 |
| 6,135,527 | A * | 10/2000 | Bily | B60R 7/02 296/24.4 |
| 6,176,406 | B1 * | 1/2001 | Laumann | B60R 9/06 224/281 |
| 6,253,976 | B1 * | 7/2001 | Coleman | B60R 11/06 224/281 |
| 6,308,873 | B1 * | 10/2001 | Baldas | B60R 7/02 217/15 |
| 6,514,021 | B2 * | 2/2003 | Delay | B62D 25/2054 410/104 |
| 6,851,735 | B2 * | 2/2005 | Hicks | B60R 7/02 224/281 |
| 2002/0014777 | A1 * | 2/2002 | Gehring | B60R 7/02 296/37.5 |
| 2005/0162050 | A1 * | 7/2005 | Berger | A47B 88/90 312/108 |
| 2005/0166862 | A1 * | 8/2005 | Sanford | A01K 1/0272 119/498 |
| 2008/0315608 | A1 * | 12/2008 | Heller | B60P 7/14 296/50 |
| 2012/0261935 | A1 * | 10/2012 | Perez | B60R 5/048 296/24.4 |

FOREIGN PATENT DOCUMENTS

| | | |
|---|---|---|
| JP | 8-216790 A | 8/1996 |
| JP | 2001-63450 A | 3/2001 |
| JP | 2005-212500 A | 8/2005 |
| JP | 2005-306361 A | 11/2005 |
| KR | 1997-0038420 A | 7/1997 |
| KR | 1998-055199 U | 10/1998 |
| KR | 1999-027701 A | 4/1999 |
| KR | 10-2008-0098362 A | 11/2008 |
| KR | 20-2013-0001275 U | 2/2013 |
| KR | 10-2013-0063201 A | 6/2013 |

* cited by examiner

SECTIONAL VIEW CUT ALONG LINE A-A

VARIABLE PARTITION APPARATUS FOR TRUNK OF VEHICLE

CROSS-REFERENCE TO RELATED APPLICATION

The present application claims priority to Korean Patent Application No. 10-2014-0115905 filed on Sep. 2, 2014, the entire contents of which is incorporated herein for all purposes by this reference.

BACKGROUND OF THE INVENTION

Field of the Invention

The present invention relates to a variable partition apparatus which may be mounted on a trunk or the like of a vehicle. More particularly, it relates to a variable partition apparatus for a trunk of a vehicle by which a trunk room can be efficiently partitioned and used at needs.

Description of Related Art

A trunk room of a vehicle is a space for accommodating articles, and is usually installed on the rear side of a passenger room in which passengers are seated. The trunk room is designed to have a predetermined size according to the type of the vehicle, and various articles are accommodated in the trunk room at needs.

Because the trunk room of the vehicle generally has a single space, reception efficiency is lowered and the articles having small sizes as compared with the trunk room are moved leftwards and rightwards or entangled with each other during driving of the vehicle, causing noise.

Therefore, according to the related art, a trunk room may be divided by applying a tray structure to a trunk room or by installing a segmentation bar configured to move forwards and rearwards along a rail, so that received articles can be prevented from being moved leftwards and rightwards or entangled with each other by fixing the received articles during driving of the vehicle.

However, when the tray structure is applied, a height of the trunk room is lowered so that only small articles can be preserved and thus loading performance is lowered, and when the segmentation bar is installed, the segmentation bar can be moved only in one direction along the rail and thus in-use efficiency is lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable partition apparatus for a trunk of a vehicle which can variously divide the trunk room at needs to efficiently use the trunk room.

In an aspect of the present invention, a variable partition apparatus for a trunk of a vehicle may include a luggage board having a guide rail and arranged on an bottom surface of a trunk room, an actuating unit configured to move forwards, rearwards, leftwards, and rightwards along the guide rail, a board fixing unit coupled to an upper portion of the actuating unit and in which a partition board is fixedly assembled while being erected, and a partition board configured to move and rotate on the luggage board by the actuating unit to variably divide the trunk room.

The actuating unit may include a housing having a plurality of ball holes at an upper portion thereof, an actuating bearing configured such that balls thereof are rotatably assembled in the ball holes, a bearing constraining body arranged at an upper side of an inside of the housing, for attaching the actuating bearing to the guide rail for constraining the actuating bearing, and a support spring arranged on a bottom surface of an inside of the housing, for resiliently supporting a bottom surface of the bearing constraining body.

The bearing constraining body is rotatably stacked on the support spring, and a coupling part with which a handling knob constituting the board fixing unit is press-fitted protrudes from an upper end thereof.

The housing may have guide ribs supporting the actuating bearing at peripheries of the ball holes.

The board fixing unit may include a board holding part stacked on the actuating unit, and a handling knob passing through one side of the board holding part to be coupled to the actuating unit.

The board holding part is configured such that knob grooves are formed at opposite sides of the fixing groove into which a lower end of the partition board is fixedly inserted, and the handling knob is press-fitted with a coupling part formed at an upper end of the bearing constraining body constituting the actuating unit while being floated on the knob groove.

The partition board may include a center board, and a first side board and a second side board assembled at left and right sides of the center board to access the center board in a sliding method.

A guide hole is formed at an upper end of the center board, and tension guides which are linearly moved along the guide hole protrudes from the first and second side boards, and tension springs are installed in the tension guide such that opposite ends thereof are fixed to the tension guide and a curved central portion thereof applies a tension while contacting wall surfaces of the guide holes.

The luggage board may have a stepped portion which is higher than a bottom surface of the luggage board at a periphery thereof, the partition board may have a first side board and a second side board assembled at left and right sides of a center board to access the center board in a sliding fashion such that the first and second side boards automatically enters an inside of the center board when an external force is applied by the stepped portion while the partition board is rotated on the luggage board.

The partition board may have a first board part and a second board unit which are adjacent to each other to be assembled in the board fixing unit while being erected, and the first board part and the second board part is expandable in a plate shape on the board fixing unit.

The variable partition apparatus for a trunk of a vehicle according to an exemplary embodiment of the present invention can variously vary the divided form of the trunk room by moving a plate (partition board) used as a partition, improving an in-use efficiency of the trunk room and increasing a convenience of the trunk room.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

The present invention relates to a variable partition apparatus installed in a trunk room of a vehicle, and is adapted to improve the in-use efficiency of a trunk room by variously dividing the trunk room as the user desires.

Figure 1:
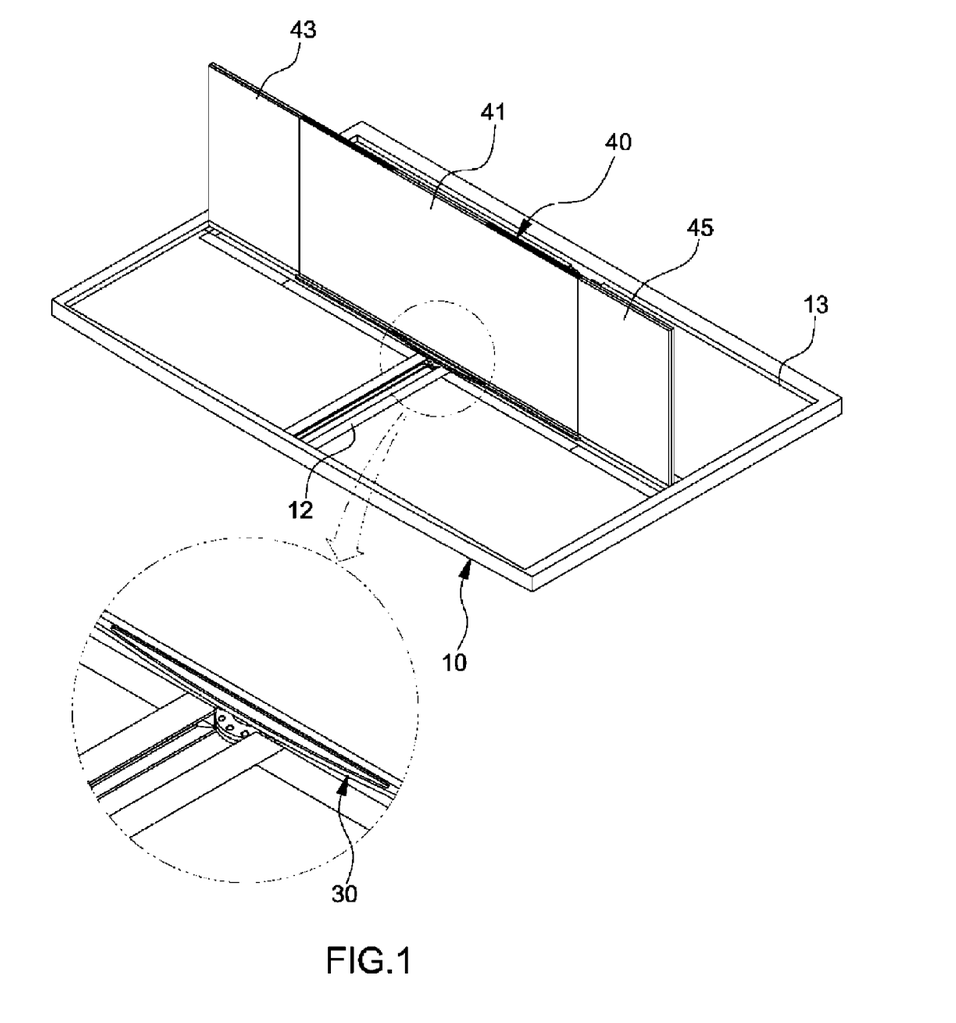
FIG. 1 is a perspective view showing a variable partition apparatus for a trunk of a vehicle according to an exemplary embodiment of the present invention.
Figure 2:
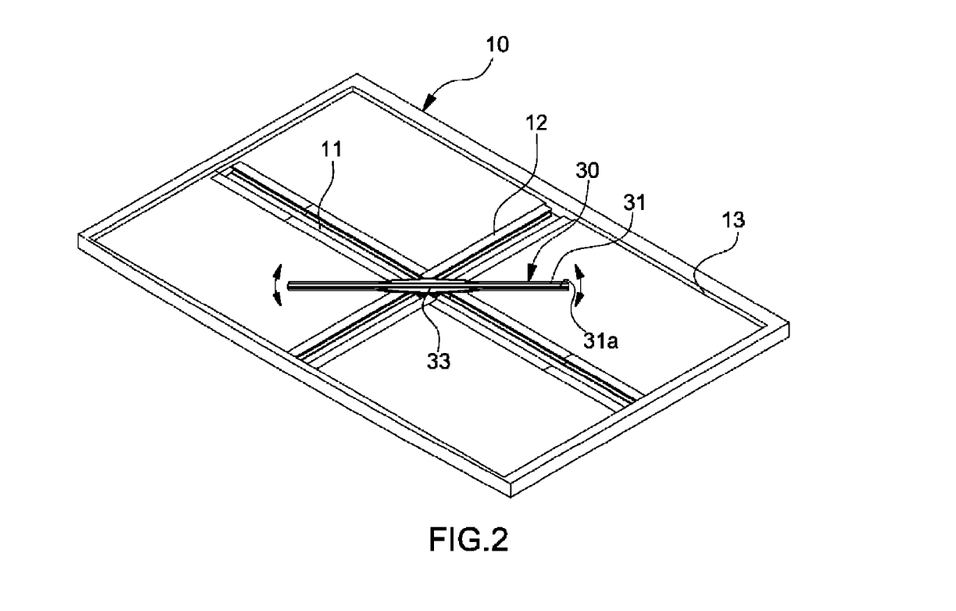
FIG. 2 is a partial view showing the variable partition apparatus for a truck of a vehicle according to the exemplary embodiment of the present invention, from which a partition board is omitted.
Figure 3:
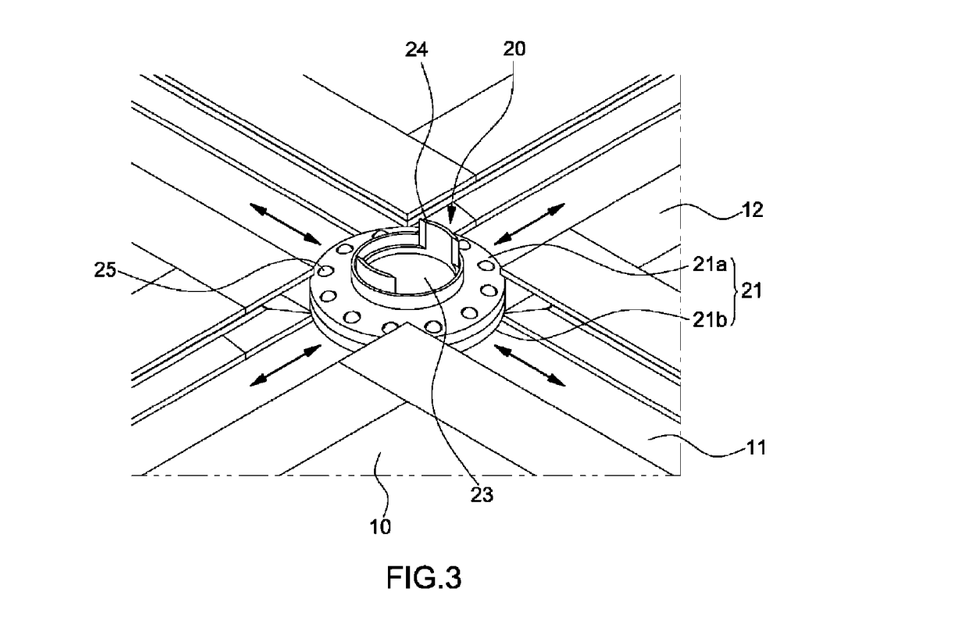
FIG. 3 is a view showing an actuating unit assembled in a guiderail of the partition apparatus for a trunk of a vehicle according to the exemplary embodiment of the present invention.

Referring to FIGS. 1 to 3, the variable partition apparatus mainly includes a luggage board 10, an actuating unit 20, a board fixing unit 30, and a partition board 40.

The luggage board 10 corresponds to a rectangular plate body which may be installed on a bottom surface of a trunk room, and a cross-shaped rail groove 11 for installing a guide rail 12 is formed at an upper end of the luggage board 10.

The guide rail 12 guides forward, rearward, leftward, and rightward linear movement of the actuating unit 20 on the luggage board 10.

As shown in FIGS. 3 to 6, the actuating unit 20 includes a housing 21, a bearing construction body 23, an actuating bearing 25, and a support spring 27.

The housing 21 has an upper housing 21a and a lower housing 21b, and has a hollow disk shape corresponding to an inner structure of the guide rail 12 having a [ ]-shaped cross-section.

The upper housing 21a has a plurality of ball holes 2l as in which balls of the actuating bearing 25 are assembled, and the support spring 27 is attached to a bottom surface of an inside of the lower housing 21b to be compressed and restored upwards and downwards.

Then, in order to prevent the balls of the actuating bearing 25 from being withdrawn from the ball holes 21aa due to self-weights thereof, guide ribs 21ab for rotatably supporting the balls of the actuating bearing 25 are provided at peripheries of the ball holes 21aa.

The bottom surface of the bearing constraining body 23 is resiliently supported by the support spring such that the bearing constraining body 23 is arranged at a predetermined height in the housing 21, and is located at an upper side of the housing 21.

Because the bottom surface of the bearing constraining body 23 is simply held on the support spring 27 in the housing 21, the bearing constraining body 23 may be freely rotated by an external force, and therefore an insertion groove 23a into which one end of the support spring 27 is inserted may be provided on the bottom surface of the bearing constraining body 23.

The bearing constraining body 23 substantially has a disk shape and is attached to one side of the actuating bearing 25 assembled in the ball holes 2l as of the upper housing 21a to constrict an operation of the actuating bearing 25, and therefore it is preferable that a periphery (adjacent to the actuating bearing 25 within the upper housing 21a) of the bearing constraining body 23 is inclined in the form of a slanted surface.

Figure 6:
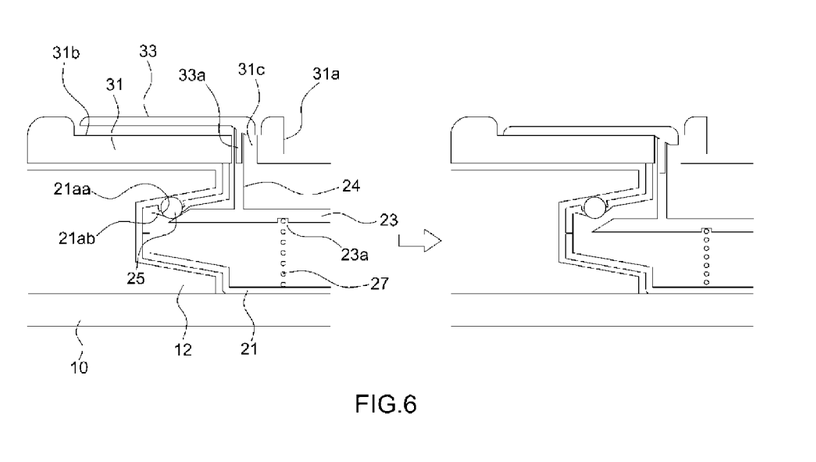
FIG. 6 is a schematic diagram showing a release method of an actuating bearing constituting the actuating unit according to the exemplary embodiment of the present invention.

As can be seen in FIG. 6, when the bearing constraining body 23 is attached to one side of the actuating bearing 25, the actuating bearing 25 is fixed between the bearing constraining body 23 and the guide rail 12 while an opposite side of the actuating bearing 25 is attached to an inner surface of the guide rail 12 to prevent unintended movement of the actuating unit 20.

A coupling part 24 for coupling to a handling knob 33, which will be described below, protrudes form an upper end of the bearing constraining body 23.

The actuating unit 20 smoothly linearly moves along the guide rail 12 while the housing 21 is positioned on the bottom surface of the rail groove 11 of the luggage board 10 when the bearing constraining body 23 is lowered while compressing the support spring 27 such that the constraint of the actuating bearing 25 is released, and the bearing constraining body 23 within the actuating unit 20 is rotated together with the handling knob 33 at needs.

Figure 4:
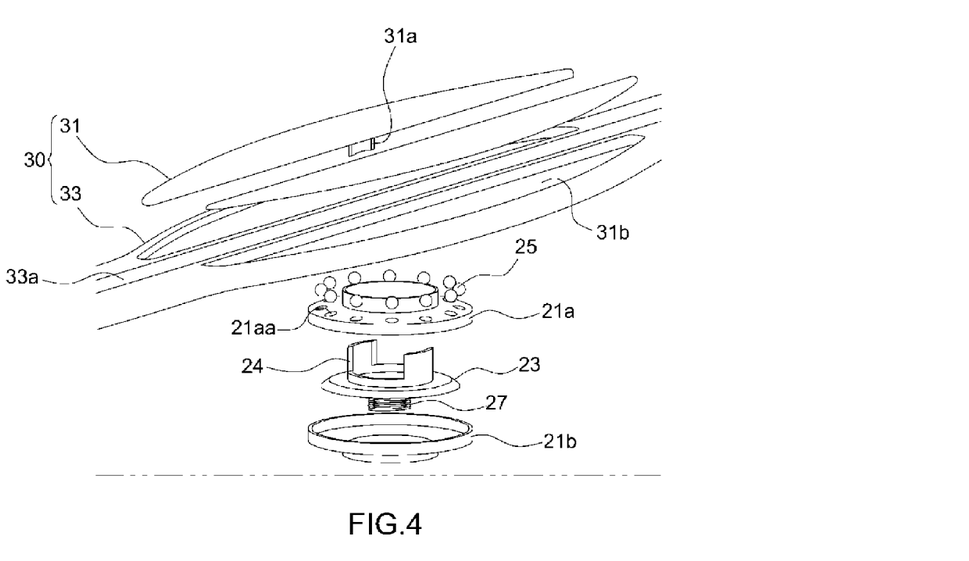
FIG. 4 is a partially exploded view showing the variable partition apparatus for a truck of a vehicle according to the exemplary embodiment of the present invention, from which the actuating unit and a board fixing unit are omitted.
Figure 5:
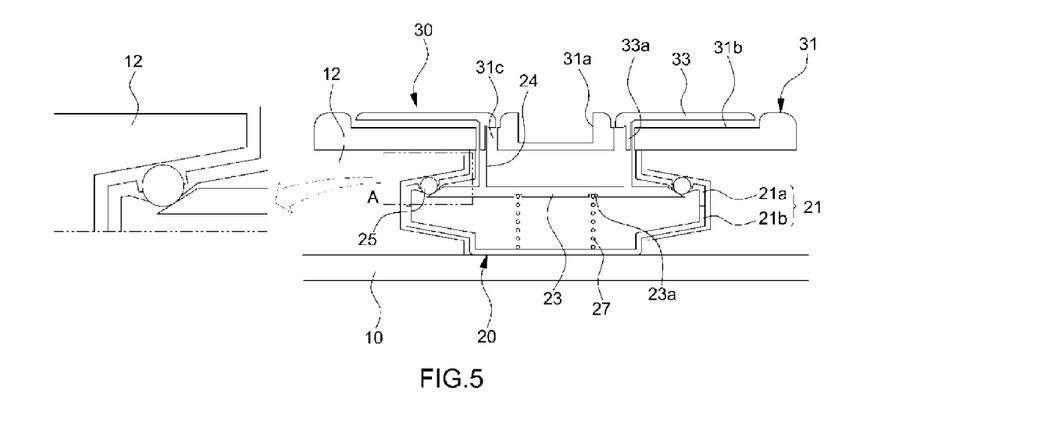
FIG. 5 is a sectional view showing a coupling structure of the actuating unit and the board fixing unit according to the exemplary embodiment of the present invention.

Meanwhile, the board fixing unit 30 assembled at an upper portion of the actuating unit 20 is adapted to fix the partition board 40 in an erected form, and as shown in FIGS. 4 and 5, includes a board holding part 31 stacked on the actuating unit 20, and a handling knob (33) passing through one side of the board holding part 31 to be coupled to the coupling part 24 of the bearing constraining body 23.

Knob grooves 31b in which the handling knob 33 is located are formed at left and right sides of the board holding unit 31 with respect to a fixing groove 31a into which a lower end of the erected partition board 40 is fixedly inserted, and an assembly hole 31c through which a coupling pin of the handling knob 33 passes is formed between the fixing groove 31a and the knob groove 31b to have a predetermined length to stably support a partition board 40.

Then, the fixing groove 31a has a predetermined depth to maintain a stable erection state of the partition board 40.

The handling knob 33 is attached to the left and right sides of the assembly hole 31c when the coupling pin 33a protruding from one side of the bottom surface of the handling knob 33 passes through the assembly hole 31c of the board holding part 31, and the coupling pin 33a passing through the assembly hole 31c is interference-fitted with and coupled to an inside of the coupling part 24 of the bearing constraining body 23.

Then, the coupling pin 33a is press-fitted with the coupling part 24 of the bearing constraining body 23 while the handling knob 33 is slightly raised (floated) from the bottom surface of the knob groove 31b of the board holding part 31.

Accordingly, when the user intends to move the board fixing unit 30 while holding the handling knob 33, he or she presses the handling knob 33 to attach the handling knob 33 to the bottom surface of the knob groove 31b as can be seen in FIG. 6, and therefore the bearing constraining body 23 is lowered to release the constraint of the actuating bearing 25 while compressing the support spring 27 such that the actuating unit 20 can be smoothly linearly moved.

The partition board 40 assembled in the board fixing unit 30 to be integrally moved with the board fixing unit 30 moves on the luggage board 10 through the actuating unit 20 and the board fixing unit 30 to variably partition a space on the luggage board 10, that is, the trunk room, and a sliding structure may be adopted to adjust a leftward and rightward length of the space.

Figure 7A:
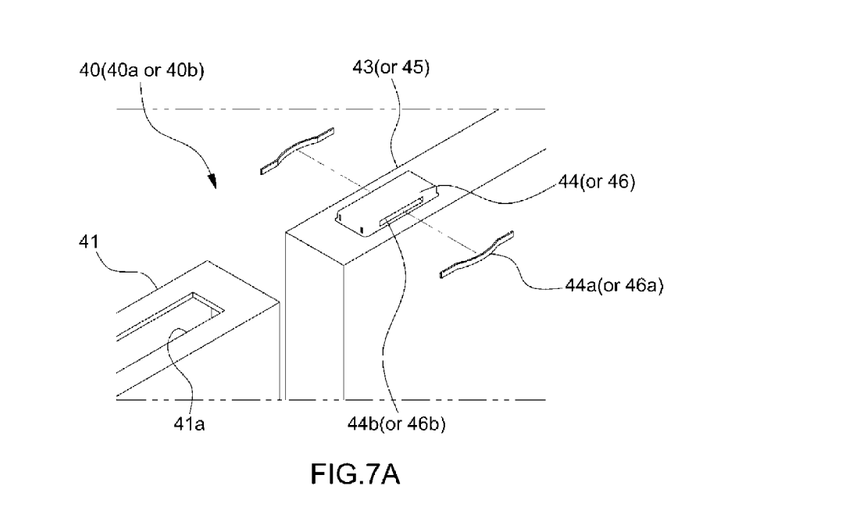
FIG. 7A and FIG. 7B are views showing a folding structure of a partition board according to the exemplary embodiment of the present invention.
Figure 7B:
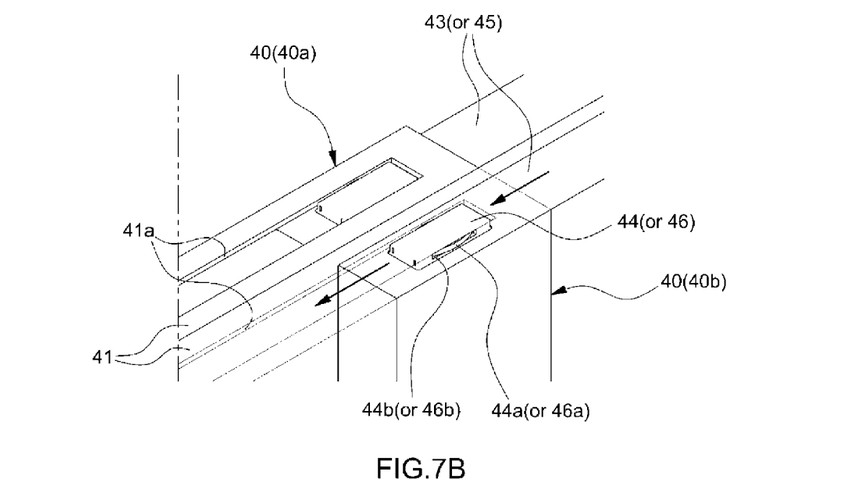

Referring to FIGS. 1, 7A, and 7B, the partition board 40 includes a center board 41, a first side board 43 and a second side board 45 assembled at left and right sides of the center board 41 so as to access the center board 41 in a sliding fashion.

A linear guide hole 41a is formed at an upper end of the center board 41, and tension guides 44 and 46 which may be linearly moved along the guide hole 41a in the guide hole 41a protrudes from upper ends of the first and second side boards 43 and 45.

Then, the tension guides 44 and 46 function to prevent separation of the first and second side boards 43 and 45 assembled in the center board 41.

Tension springs 44a and 46a are installed in the tension guides 44 and 46 to limit movement of the side boards 43 and 45.

The tension springs 44a and 46a have a plate spring form such that central portions thereof is bent in a curved shape, and opposite ends of the tension springs 44a and 46a are fixed to insides (opposite ends) of the tension guides 44 and 46 and a curved central portion thereof passes through side holes 44b and 46b of the tension guides 44 and 46 to apply a tension while contacting a wall surface of the guide hole 41b of the center board 41.

Accordingly, the tension springs 44a and 46a apply a tension to the wall surface of the guide hole 41a to limit movement of the side boards 43 and 45 when the side boards 43 and 45 are slid, and therefore the side boards 43 and 45 are fixed to predetermined locations and are prevented from being unintendedly moved.

Accordingly, the first and second side boards 43 and 45 limit slides of the side boards 43 and 45 accessing the center board 41 due to the tension springs 44a and 46a.

Figure 8:
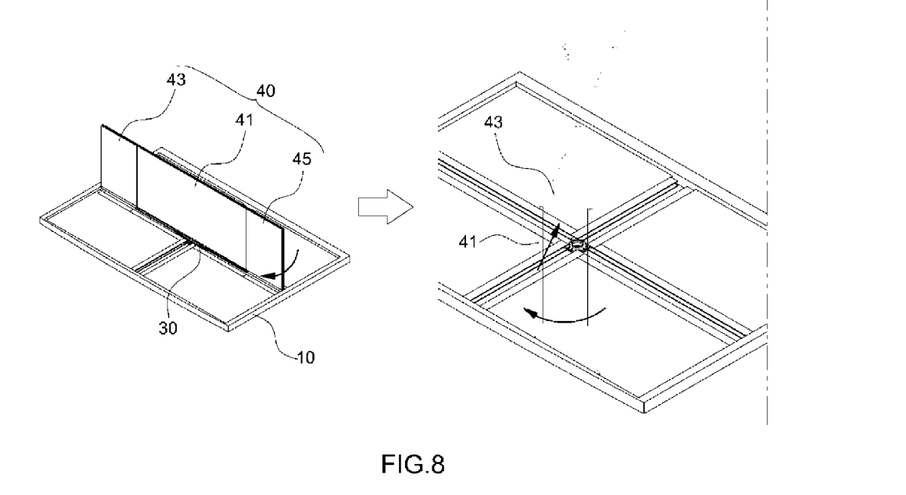
FIG. 8 is a schematic diagram showing an automatic folding method of the partition board according to the exemplary embodiment of the present invention.

The partition board 40 employing the tension springs 44a and 46a is configured such that the first and second side boards 43 and 45 are moved toward an inside of the center board 41 to contact the center board 41 only when an external force is applied to the partition board 40, in which case because the partition board 40 has a length corresponding to a leftward/rightward width longer than a forward/rearward width of the luggage board 10, the first and second side boards 43 and 45 are automatically folded to enter an inside of the center board 41 at the same time when the partition board 40 is rotated, when an external force is applied to the first and second side boards 43 and 45 by a stepped portion 13 (which is higher than the bottom surface of the inside of the luggage board 10) formed at a periphery of the luggage board 10 when the partition board 40 is rotated, that is, a load is applied by the stepped portion 13 after the partition board 40 is expanded to a maximum length (see FIG. 8).

The side boards 43 and 45 slid into the center board 41 may be manually pulled and extracted to the outside of the center board 41.

Figure 9:
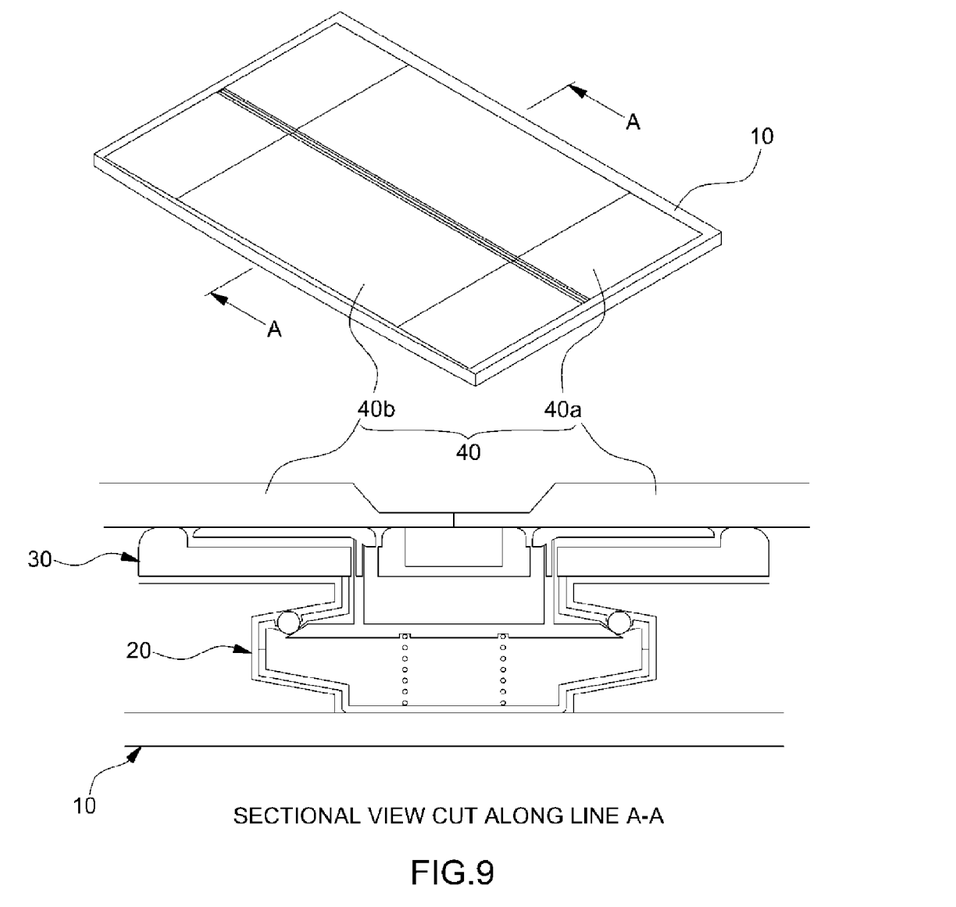
FIG. 9 is a view showing a state in which the partition board of the variable partition apparatus according to the exemplary embodiment of the present invention is unfolded.
Figure 10:
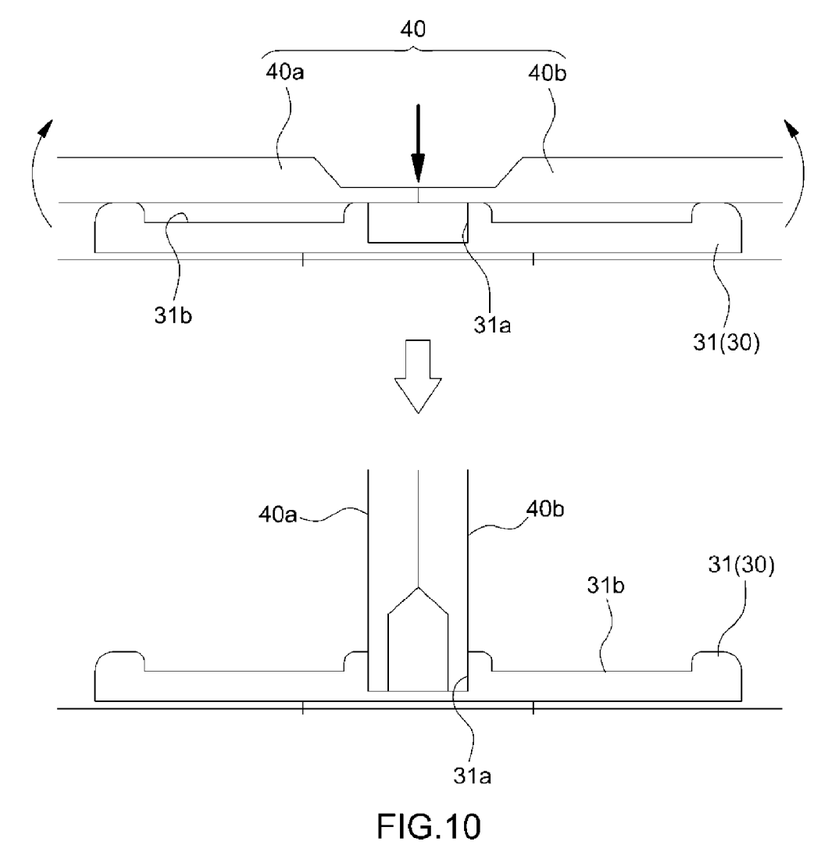
FIG. 10 is a schematic diagram showing an automatic folding method of erecting the partition board and fixing the partition board to a board fixing unit according to the exemplary embodiment of the present invention.

As can be seen in FIG. 9 and FIG. 10, the partition board 40 may be largely divided into a first board part 40 and a second board part 40b.

That is, the partition board 40 may be configured such that a leftward/rightward length can be adjusted in a sliding fashion and may include the first board part 40a and the second board part 40b which can be divided in a forward/rearward direction at the same time.

Then, the first board part 40a and the second board part 40b are divided to be adjacent to each other simply in a contact fashion or in a simple separation fashion.

The partition board 40 may be unfolded while facing ends (upper or lower ends) of the first board part 40a and the second board part 40b on the board fixing unit 30, and may be folded while facing side surfaces of the first board part 40a and the second board part 40b.

As can be seen in FIG. 9, the trunk room may be used as a single space when the first board part 40a and the second board part 40b are separated such that the partition board 40 is unfolded to be loaded on the board fixing unit, and as can be seen in FIG. 10, the trunk room may be divided into two spaces when the first board part 40a and the second board part 40b become close to each other such that a lower end of the partition board 40 is inserted into the fixing groove 31a of the board holding part 31 after the partition board 40 is folded into a half size.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable partition apparatus for a trunk of a vehicle, comprising:
    a luggage board having a guide rail arranged on a bottom surface of a trunk room in the trunk;
    an actuating unit configured to move forwards, rearwards, leftwards, and rightwards along the guide rail; and
    a board fixing unit rotatably coupled to an upper portion of the actuating unit and in which a partition board is fixedly assembled while being erected,
    wherein the partition board is configured to move with the actuating unit and rotate on the luggage board with respect to the actuating unit to variably divide the trunk room.

2. The variable partition apparatus of claim 1, wherein the actuating unit comprises:
    a housing having a plurality of ball holes at an upper portion thereof;
    an actuating bearing configured such that balls thereof are rotatably assembled in the ball holes;
    a bearing constraining body arranged at an upper side of an inside of the housing, for attaching the actuating bearing to the guide rail for constraining the actuating bearing; and
    a support spring arranged on a bottom surface of an inside of the housing, for resiliently supporting a bottom surface of the bearing constraining body.

3. The variable partition apparatus of claim 2, wherein the bearing constraining body is rotatably stacked on the support spring, and a coupling part with which a handling knob constituting the board fixing unit is press-fitted protrudes from an upper end thereof.

4. The variable partition apparatus of claim 2, wherein the housing has guide ribs supporting the actuating bearing at peripheries of the ball holes.

5. The variable partition apparatus of claim 1, wherein the board fixing unit comprises a board holding part stacked on the actuating unit, and a handling knob passing through one side of the board holding part to be coupled to the actuating unit.

6. The variable partition apparatus of claim 5, wherein the board holding part is configured such that knob grooves are formed at opposite sides of the fixing groove into which a lower end of the partition board is fixedly inserted, and the handling knob is press-fitted with a coupling part formed at an upper end of the bearing constraining body constituting the actuating unit while being floated on the knob groove.

7. The variable partition apparatus of claim 1, wherein the partition board comprises a center board, and a first side board and a second side board assembled at left and right sides of the center board to access the center board in a sliding method.

8. The variable partition apparatus of claim 7, wherein a guide hole is formed at an upper end of the center board, and tension guides which are linearly moved along the guide hole protrudes from the first and second side boards, and tension springs are installed in the tension guide such that opposite ends thereof are fixed to the tension guide and a curved central portion thereof applies a tension while contacting wall surfaces of the guide holes.

9. The variable partition apparatus of claim 1, wherein the luggage board has a stepped portion which is higher than a bottom surface of the luggage board at a periphery thereof, the partition board has a first side board and a second side board assembled at left and right sides of a center board to access the center board in a sliding fashion such that the first and second side boards automatically enters an inside of the center board when an external force is applied by the stepped portion while the partition board is rotated on the luggage board.

10. The variable partition apparatus of claim 1, wherein the partition board has a first board part and a second board unit which are adjacent to each other to be assembled in the board fixing unit while being erected, and the first board part and the second board part is expandable in a plate shape on the board fixing unit.

11. A variable partition apparatus for a trunk of a vehicle, comprising:
    a luggage board having a guide rail arranged on a bottom surface of a trunk room in the trunk;
    an actuating unit configured to move forwards, rearwards, leftwards, and rightwards along the guide rail; and
    a board fixing unit rotatably coupled to an upper portion of the actuating unit and in which a partition board is fixedly assembled while being erected,
    wherein the partition board is configured to move with the actuating unit and rotate on the luggage board with respect to the actuating unit configured to move forwards, rearwards, leftwards, and rightwards along the guide rail, thereby variably dividing the trunk room.

* * * * *